United States Patent
Lee

(10) Patent No.: US 10,956,598 B1
(45) Date of Patent: Mar. 23, 2021

(54) METHOD FOR PREVENTING BREACH OF ORIGINAL DATA FOR DEEP LEARNING AND DATA BREACH PREVENTING DEVICE USING THEM

(71) Applicant: Deeping Source Inc., Seoul (KR)

(72) Inventor: Sumin Lee, Rochester, NY (US)

(73) Assignee: DEEPING SOURCE INC., Seoul (KR)

(*) Notice: Subject to any disclaimer, the term of this patent is extended or adjusted under 35 U.S.C. 154(b) by 0 days.

(21) Appl. No.: 16/858,562

(22) Filed: Apr. 24, 2020

(51) Int. Cl.
| | |
|---|---|
| G06F 21/00 | (2013.01) |
| G06F 21/62 | (2013.01) |
| G06F 21/16 | (2013.01) |
| G06N 20/10 | (2019.01) |
| G06N 3/08 | (2006.01) |

(52) U.S. Cl.
CPC .......... *G06F 21/6218* (2013.01); *G06F 21/16* (2013.01); *G06N 3/08* (2013.01); *G06N 20/10* (2019.01); *G06F 2221/0733* (2013.01)

(58) Field of Classification Search
CPC .............. G06F 21/6218; G06F 21/16; G06F 2221/0733; G06N 20/10; G06N 3/08
See application file for complete search history.

(56) References Cited

U.S. PATENT DOCUMENTS

| | | | | |
|---|---|---|---|---|
| 6,122,403 | A * | 9/2000 | Rhoads | G06Q 20/341 |
| | | | | 382/233 |
| 9,292,895 | B2 * | 3/2016 | Rodriguez | G06F 3/0485 |
| 10,621,379 | B1 * | 4/2020 | Kim | G06N 3/0454 |
| 2015/0072728 | A1 * | 3/2015 | Rodriguez | H04N 5/77 |
| | | | | 455/556.1 |
| 2019/0019311 | A1 * | 1/2019 | Hu | G06N 3/084 |
| 2019/0042888 | A1 * | 2/2019 | Tsutsui | G06T 7/11 |
| 2019/0370440 | A1 * | 12/2019 | Gu | G06N 3/08 |
| 2020/0034520 | A1 * | 1/2020 | Kim | G06F 21/6245 |

* cited by examiner

*Primary Examiner* — Mahfuzur Rahman
(74) *Attorney, Agent, or Firm* — Bekiares Eliezer LLP

(57) ABSTRACT

A method for preventing breach of original data for deep learning is provided. The method includes steps of: a data breach preventing device (a) adding noise onto the acquired original data to generate 1-st noisy data; and (b)(b1) while increasing an integer k from 1 to an integer larger than 0, (i) inputting k-th noisy data into a learning network, to apply learning operations to the k-th noisy data using learned parameters of the learning network, and to output k-th characteristic information, and (ii) launching an adversarial attack on the k-th noisy data via backpropagation using at least one of (ii-1) (k_1)-st losses calculated using the k-th characteristic information and a 1-st ground truth, and (ii-2) (k_2)-nd losses calculated using (1) a k-th task specific output and (2) a 2-nd ground truth, and generating (k+1)-th noisy data, and (b2) as a result, generating n-th noisy data as watermarked data.

20 Claims, 5 Drawing Sheets
(1 of 5 Drawing Sheet(s) Filed in Color)

(A) ORIGINAL IMAGE (B) NOISY IMAGE (C) WATERMARKED IMAGE

METHOD FOR PREVENTING BREACH OF ORIGINAL DATA FOR DEEP LEARNING AND DATA BREACH PREVENTING DEVICE USING THEM

FIELD OF THE DISCLOSURE

The present disclosure relates to a method for preventing breach of original data to be used for deep learning and a data breach preventing device using the same; and more particularly, to the method for converting the original data into optimal noisy data that humans can recognize but from which a learning network outputs different results, thus preventing the breach of the original data to be used for the deep learning, and the data breach preventing device using the same.

BACKGROUND OF THE DISCLOSURE

Big data refers to data including all of unstructured data and semi-structured data not utilized so far, like e-commerce data, metadata, web log data, radio frequency identification (RFID) data, sensor network data, social network data, data of Internet text and documents, Internet search indexing data, as well as all of structured data used by conventional enterprises or public institutions. Data as such are referred to as big data in the sense that common software tools and computer systems cannot easily handle such a huge volume of data.

And, although such big data may be insignificant by itself, it can be useful for generation of new data, judgment, or prediction in various fields through machine learning on patterns and the like.

And, in the machine learning and artificial intelligence industry, there is a need to share data sets to be used for deep learning, and accordingly, the data sets are becoming high value assets in the same industry.

However, there are various problems in sharing the data sets.

For example, when a user, who lacks resources to preview, verify, or label the data sets, delegates handling of the data sets to a third party, since the third party can directly access the original data included in the data sets, the original data is at risk of illegal copying. In addition, the third party can train a new deep learning network using the original data, and accordingly, there is a problem that the user's rights to the data sets are violated.

To prevent this, a method of converting the original data for the deep learning into naive watermarked data for sharing has been proposed.

However, such a method is mostly useless for protecting the original data because the learning network trained with the naive watermarked data shows performance almost similar to that of the learning network trained with the original data.

Also, since the naive watermark is easily erasable by image processing technology, there is a limit to protecting the original data.

SUMMARY OF THE DISCLOSURE

It is an object of the present disclosure to solve all the aforementioned problems.

It is another object of the present disclosure to prevent breach of original data to be used for deep learning.

It is still another object of the present disclosure to protect the original data, by generating optimal noisy data humans can recognize but from which a learning network outputs different results unlike when using the original data.

It is still yet another object of the present disclosure to provide watermarked data, from which the original data cannot be recovered by using data processing technology such as image processing technology.

It is still yet another object of the present disclosure to provide the watermarked data which appears to humans as minimally deteriorated, and degrade accuracy of the learned learning network having been trained with the watermarked data.

In order to accomplish the objects above, distinctive structures of the present disclosure are described as follows.

In accordance with one aspect of the present disclosure, there is provided a method for preventing breach of original data to be used for deep learning, including steps of: (a) a data breach preventing device, if the original data is acquired, performing or supporting another device to perform a process of adding noise onto the original data, to thereby generate 1-st noisy data; and (b) the data breach preventing device, (b1) while increasing an integer k from 1 to n−1 wherein n is an integer larger than 1, performing or supporting another device to perform iteration of (i) a process of inputting k-th noisy data into a learning network, to thereby allow the learning network to apply one or more learning operations to the k-th noisy data using one or more learned parameters of the learning network, and thus to output k-th characteristic information about the k-th noisy data, and (ii) a process of launching an adversarial attack on the k-th noisy data via backpropagation using at least one of (ii-1) one or more (k_1)-st losses calculated by referring to (1) the k-th characteristic information and (2) at least one 1-st ground truth corresponding to the original data, and (ii-2) one or more (k_2)-nd losses calculated by referring to (1) at least one k-th task specific output created by using the k-th characteristic information and (2) at least one 2-nd ground truth corresponding to the original data, and thus a process of generating (k+1)-th noisy data, and (b2) as a result of the iteration, generating or supporting another device to generate n-th noisy data as watermarked data corresponding to the original data.

As one example, the learning network includes a 1-st learning network to an m-th learning network respectively having one or more 1-st learned parameters to one or more m-th learned parameters wherein m is an integer greater than 0, and wherein, at the step of (b), the data breach preventing device performs or supports another device to perform a process of inputting the k-th noisy data respectively into the 1-st learning network to the m-th learning network, to thereby allow the 1-st learning network to the m-th learning network to (i) apply the learning operations with the 1-st learned parameters to the m-th learned parameters to the k-th noisy data respectively, and thus output (k_1)-st characteristic information to (k_m)-th characteristic information about the k-th noisy data, (ii) calculate the (k_1)-st losses by referring to at least one averaged value over a (k_1_1)-st loss to a (k_1_m)-th loss which are calculated by using the 1-st ground truth and each piece of the (k_1)-st characteristic information to the (k_m)-th characteristic information, and (iii) calculate the (k_2)-nd losses by referring to at least one averaged value over a (k_2_1)-st loss to a (k_2_m)-th loss which are calculated by using the 2-nd ground truth and each of a (k_1)-st task specific output to a (k_m)-th task specific output respectively created by using the (k_1)-st characteristic information to the (k_m)-th characteristic information.

As one example, the data breach preventing device performs or supports another device to perform (i) a process of averaging over a (k_1_1)-st summed loss to a (k_1_m)-th summed loss which are calculated by adding a ((k−1)_1)-st loss respectively onto each of the (k_1_1)-st loss to the (k_1_m)-th loss, in the process of calculating the (k_1)-st losses, and (ii) a process of averaging over a (k_2_1)-st summed loss to a (k_2_m)-th summed loss which are calculated by adding a ((k−1)_2)-nd loss respectively onto each of the (k_2_1)-st loss to the (k_2_m)-th loss, in the process of calculating the (k_2)-nd losses.

As one example, the data breach preventing device performs or supports another device to perform (i) a process of comparing between elements included in each of 1-st pairs whose elements are comprised of (i-1) each piece of the (k_1)-st characteristic information to the (k_m)-th characteristic information and (i-2) each piece of 1-st original characteristic information to m-th original characteristic information respectively created by inputting the original data into the 1-st learning network to the m-th learning network, to thereby acquire a (k_1)-st condition value corresponding to the number of a part of the 1-st pairs whose elements are determined as different from each other, (ii) a process of comparing between elements included in each of 2-nd pairs whose elements are comprised of (ii-1) each of a (k_1)-st task specific output to a (k_m)-th task specific output and (ii-2) each of a 1-st original task specific output to an m-th original task specific output respectively created by referring to the 1-st original characteristic information to the m-th original characteristic information, to thereby acquire a (k_2)-nd condition value corresponding to the number of a part of the 2-nd pairs whose elements are determined as different from each other, (iii) a process of acquiring a k-th termination condition value by adding one of the (k_1)-st condition value and the (k_2)-nd condition value onto a (k-1)-th termination condition value, and (iv) after the (k+1)-th noisy data is created, a process of determining whether the k-th termination condition value is equal to or greater than a predetermined threshold, and if the k-th termination condition value is determined as equal to or greater than the predetermined threshold, a process of stopping the iteration and outputting the (k+1)-th noisy data as the watermarked data.

As one example, at the step of (b), the data breach preventing device performs or supports another device to perform (i) a process of applying random rotation to the k-th noisy data, to thereby generate (k_1)-st spatial data to (k_j)-th spatial data wherein j is an integer greater than 0, (ii) a process of inputting the (k_1)-st spatial data to the (k_j)-th spatial data into the learning network, to thereby allow the learning network to apply the deep-learning operation to the (k_1)-st spatial data to the (k_j)-th spatial data and thus to output (k_1)-st spatial characteristic information to (k_j)-th spatial characteristic information, (iii) a process of calculating the (k_1)-st losses by referring to at least one averaged value over a (k_1_1)-st spatial loss to a (k_1_j)-th spatial loss which are calculated by using the 1-st ground truth and each piece of the (k_1)-st spatial characteristic information to the (k_j)-th spatial characteristic information, and (iv) a process of calculating the (k_2)-nd losses by referring to at least one averaged value over a (k_2_1)-st spatial loss to a (k_2_j)-th spatial loss which are calculated by using the 2-nd ground truth and each of a (k_1)-st spatial task specific output to a (k_j)-th spatial task specific output respectively created by using the (k_1)-st spatial characteristic information to the (k_j)-th spatial characteristic information.

As one example, the data breach preventing device performs or supports another device to perform (i) a process of averaging over a (k_1_1)-st summed spatial loss to a (k_1_j)-th summed spatial loss which are calculated by adding a ((k−1)_1)-st loss respectively onto each of the (k_1_1)-st spatial loss to the (k_1_j)-th spatial loss, in the process of calculating the (k_1)-st losses, and (ii) a process of averaging over a (k_2_1)-st summed spatial loss to a (k_2_j)-th summed spatial loss which are calculated by adding a ((k−1)_2)-nd loss respectively onto each of the (k_2_1)-st spatial loss to the (k_2_j)-th spatial loss, in the process of calculating the (k_2)-nd losses.

As one example, the data breach preventing device performs or supports another device to perform (i) a process of comparing between elements included in each of 1-st pairs whose elements are comprised of (i-1) each piece of the (k_1)-st spatial characteristic information to the (k_j)-th spatial characteristic information and (i-2) each piece of original characteristic information created by inputting the original data into the learning network, to thereby acquire a (k_1)-st condition value corresponding to the number of a part of the 1-st pairs whose elements are determined as different from each other, (ii) a process of comparing between elements included in each of 2-nd pairs whose elements are comprised of (ii-1) each of a (k_1)-st spatial task specific output to a (k_j)-th spatial task specific output and (ii-2) an original task specific output created by referring to the original characteristic information, to thereby acquire a (k_2)-nd condition value corresponding to the number of a part of the 2-nd pairs whose elements are determined as different from each other, (iii) a process of acquiring a k-th termination condition value by adding one of the (k_1)-st condition value and the (k_2)-nd condition value onto a (k−1)-th termination condition value, and (iv) after the (k+1)-th noisy data is created, a process of determining whether the k-th termination condition value is equal to or greater than a predetermined threshold, and if the k-th termination condition value is determined as equal to or greater than the predetermined threshold, a process of stopping the iteration and outputting the (k+1)-th noisy data as the watermarked data.

As one example, the data breach preventing device performs or supports another device to perform a process of randomly selecting one or more angles θ ranging from −Π to Π and a process of rotating the k-th noisy data as corresponding to each of the angles θ, in the process of creating the (k_1)-st spatial data to the (k_j)-th spatial data.

As one example, at the step of (b), the data breach preventing device performs or supports another device to perform (i) a process of comparing (i-1) (k+1)-th characteristic information created by inputting the (k+1)-th noisy data into the learning network and (i-2) original characteristic information created by inputting the original data into the learning network, and if the (k+1)-th characteristic information and the original characteristic information are determined as different, a process of stopping the iteration and outputting the (k+1)-th noisy data as the watermarked data, and (ii) a process of comparing (ii-1) a (k+1)-th task specific output created by referring to the (k+1)-th characteristic information and (ii-2) an original task specific output created by referring to the original characteristic information, and if the (k+1)-th task specific output and the original task specific output are determined as different, a process of stopping the iteration and outputting the (k+1)-th noisy data as the watermarked data.

As one example, at the step of (a), the data breach preventing device performs or supports another device to perform a process of adding random noise, according to a normal distribution with one of variances and one of means created by a noise function, onto the original data.

In accordance with another aspect of the present disclosure, there is provided a data breach preventing device for preventing breach of original data to be used for deep learning, including: at least one memory that stores instructions; and at least one processor configured to execute the instructions to perform or support another device to perform: (I) if the original data is acquired, a process of adding noise onto the original data, to thereby generate 1-st noisy data, and (II) (II-1) while increasing an integer k from 1 to n−1 wherein n is an integer larger than 1, (i) a process of inputting k-th noisy data into a learning network, to thereby allow the learning network to apply one or more learning operations to the k-th noisy data using one or more learned parameters of the learning network, and thus to output k-th characteristic information about the k-th noisy data, and (ii) a process of launching an adversarial attack on the k-th noisy data via backpropagation using at least one of (ii-1) one or more (k_1)-st losses calculated by referring to (1) the k-th characteristic information and (2) at least one 1-st ground truth corresponding to the original data, and (ii-2) one or more (k_2)-nd losses calculated by referring to (1) at least one k-th task specific output created by using the k-th characteristic information and (2) at least one 2-nd ground truth corresponding to the original data, and thus a process of generating (k+1)-th noisy data, and (II-2) as a result of the iteration, a process of generating n-th noisy data as watermarked data corresponding to the original data.

As one example, the learning network includes a 1-st learning network to an m-th learning network respectively having one or more 1-st learned parameters to one or more m-th learned parameters wherein m is an integer greater than 0, and wherein, at the process of (II), the processor performs or supports another device to perform a process of inputting the k-th noisy data respectively into the 1-st learning network to the m-th learning network, to thereby allow the 1-st learning network to the m-th learning network to (i) apply the learning operations with the 1-st learned parameters to the m-th learned parameters to the k-th noisy data respectively, and thus output (k_1)-st characteristic information to (k_m)-th characteristic information about the k-th noisy data, (ii) calculate the (k_1)-st losses by referring to at least one averaged value over a (k_1_1)-st loss to a (k_1_m)-th loss which are calculated by using the 1-st ground truth and each piece of the (k_1)-st characteristic information to the (k_m)-th characteristic information, and (iii) calculate the (k_2)-nd losses by referring to at least one averaged value over a (k_2_1)-st loss to a (k_2_m)-th loss which are calculated by using the 2-nd ground truth and each of a (k_1)-st task specific output to a (k_m)-th task specific output respectively created by using the (k_1)-st characteristic information to the (k_m)-th characteristic information.

As one example, the processor performs or supports another device to perform (i) a process of averaging over a (k_1_1)-st summed loss to a (k_1_m)-th summed loss which are calculated by adding a ((k−1)_1)-st loss respectively onto each of the (k_1_1)-st loss to the (k_1_m)-th loss, in the process of calculating the (k_1)-st losses, and (ii) a process of averaging over a (k_2_1)-st summed loss to a (k_2_m)-th summed loss which are calculated by adding a ((k−1)_2)-nd loss respectively onto each of the (k_2_1)-st loss to the (k_2_m)-th loss, in the process of calculating the (k_2)-nd losses.

As one example, the processor performs or supports another device to perform (i) a process of comparing between elements included in each of 1-st pairs whose elements are comprised of (i-1) each piece of the (k_1)-st characteristic information to the (k_m)-th characteristic information and (i-2) each piece of 1-st original characteristic information to m-th original characteristic information respectively created by inputting the original data into the 1-st learning network to the m-th learning network, to thereby acquire a (k_1)-st condition value corresponding to the number of a part of the 1-st pairs whose elements are determined as different from each other, (ii) a process of comparing between elements included in each of 2-nd pairs whose elements are comprised of (ii-1) each of a (k_1)-st task specific output to a (k_m)-th task specific output and (ii-2) each of a 1-st original task specific output to an m-th original task specific output respectively created by referring to the 1-st original characteristic information to the m-th original characteristic information, to thereby acquire a (k_2)-nd condition value corresponding to the number of a part of the 2-nd pairs whose elements are determined as different from each other, (iii) a process of acquiring a k-th termination condition value by adding one of the (k_1)-st condition value and the (k_2)-nd condition value onto a (k−1)-th termination condition value, and (iv) after the (k+1)-th noisy data is created, a process of determining whether the k-th termination condition value is equal to or greater than a predetermined threshold, and if the k-th termination condition value is determined as equal to or greater than the predetermined threshold, a process of stopping the iteration and outputting the (k+1)-th noisy data as the watermarked data.

As one example, at the process of (II), the processor performs or supports another device to perform (i) a process of applying random rotation to the k-th noisy data, to thereby generate (k_1)-st spatial data to (k_j)-th spatial data wherein j is an integer greater than 0, (ii) a process of inputting the (k_1)-st spatial data to the (k_j)-th spatial data into the learning network, to thereby allow the learning network to apply the deep-learning operation to the (k_1)-st spatial data to the (k_j)-th spatial data and thus to output (k_1)-st spatial characteristic information to (k_j)-th spatial characteristic information, (iii) a process of calculating the (k_1)-st losses by referring to at least one averaged value over a (k_1_1)-st spatial loss to a (k_1_j)-th spatial loss which are calculated by using the 1-st ground truth and each piece of the (k_1)-st spatial characteristic information to the (k_j)-th spatial characteristic information, and (iv) a process of calculating the (k_2)-nd losses by referring to at least one averaged value over a (k_2_1)-st spatial loss to a (k_2_j)-th spatial loss which are calculated by using the 2-nd ground truth and each of a (k_1)-st spatial task specific output to a (k_j)-th spatial task specific output respectively created by using the (k_1)-st spatial characteristic information to the (k_j)-th spatial characteristic information.

As one example, the processor performs or supports another device to perform (i) a process of averaging over a (k_1_1)-st summed spatial loss to a (k_1_j)-th summed spatial loss which are calculated by adding a ((k−1)_1)-st loss respectively onto each of the (k_1_1)-st spatial loss to the (k_1_j)-th spatial loss, in the process of calculating the (k_1)-st losses, and (ii) a process of averaging over a (k_2_1)-st summed spatial loss to a (k_2_j)-th summed spatial loss which are calculated by adding a ((k−1)_2)-nd loss respectively onto each of the (k_2_1)-st spatial loss to the (k_2_j)-th spatial loss, in the process of calculating the (k_2)-nd losses.

As one example, the processor performs or supports another device to perform (i) a process of comparing between elements included in each of 1-st pairs whose elements are comprised of (i-1) each piece of the (k_1)-st spatial characteristic information to the (k_j)-th spatial characteristic information and (i-2) each piece of original characteristic information created by inputting the original data into the learning network, to thereby acquire a (k_1)-st condition value corresponding to the number of a part of the 1-st pairs whose elements are determined as different from each other, (ii) a process of comparing between elements included in each of 2-nd pairs whose elements are comprised of (ii-1) each of a (k_1)-st spatial task specific output to a (k_j)-th spatial task specific output and (ii-2) an original task specific output created by referring to the original characteristic information, to thereby acquire a (k_2)-nd condition value corresponding to the number of a part of the 2-nd pairs whose elements are determined as different from each other, (iii) a process of acquiring a k-th termination condition value by adding one of the (k_1)-st condition value and the (k_2)-nd condition value onto a (k−1)-th termination condition value, and (iv) after the (k+1)-th noisy data is created, a process of determining whether the k-th termination condition value is equal to or greater than a predetermined threshold, and if the k-th termination condition value is determined as equal to or greater than the predetermined threshold, a process of stopping the iteration and outputting the (k+1)-th noisy data as the watermarked data.

As one example, the processor performs or supports another device to perform a process of randomly selecting one or more angles θ ranging from −Π to Π and a process of rotating the k-th noisy data as corresponding to each of the angles θ, in the process of creating the (k_1)-st spatial data to the (k_j)-th spatial data.

As one example, at the process of (II), the processor performs or supports another device to perform (i) a process of comparing (i-1) (k+1)-th characteristic information created by inputting the (k+1)-th noisy data into the learning network and (i-2) original characteristic information created by inputting the original data into the learning network, and if the (k+1)-th characteristic information and the original characteristic information are determined as different, a process of stopping the iteration and outputting the (k+1)-th noisy data as the watermarked data, and (ii) a process of comparing (ii-1) a (k+1)-th task specific output created by referring to the (k+1)-th characteristic information and (ii-2) an original task specific output created by referring to the original characteristic information, and if the (k+1)-th task specific output and the original task specific output are determined as different, a process of stopping the iteration and outputting the (k+1)-th noisy data as the watermarked data.

As one example, at the process of (I), the processor performs or supports another device to perform a process of adding random noise, according to a normal distribution with one of variances and one of means created by a noise function, onto the original data.

In addition, recordable media that are readable by a computer for storing a computer program to execute the method of the present disclosure are further provided.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The above and other objects and features of the present disclosure will become apparent from the following description of preferred embodiments given in conjunction with the accompanying drawings, in which.

DETAILED DESCRIPTION OF THE PREFERRED EMBODIMENTS

Figure 1:
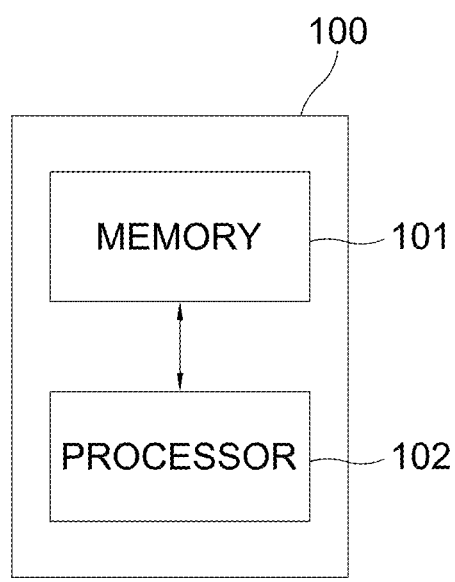
FIG. 1 is a drawing schematically illustrating a data breach preventing device which is used to prevent breach of original data to be used for deep learning in accordance with one example embodiment of the present disclosure.

In the following detailed description, reference is made to the accompanying drawings that show, by way of illustration, specific embodiments in which the present disclosure may be practiced. These embodiments are described in sufficient detail to enable those skilled in the art to practice the present disclosure. It is to be understood that the various embodiments of the present disclosure, although different, are not necessarily mutually exclusive. For example, a particular feature, structure, or characteristic described herein may be implemented as being changed from an embodiment to other embodiments without departing from the spirit and scope of the present disclosure. In addition, it is to be understood that the position or arrangement of individual elements within each embodiment may be modified without departing from the spirit and scope of the present disclosure. The following detailed description is, therefore, not to be taken in a limiting sense, and the scope of the present disclosure is described as including the appended claims, along with the full range of equivalents to which the claims are entitled. In the drawings, like numerals refer to the same or similar components throughout the several aspects.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

The headings and abstract of the present disclosure provided herein are for convenience only and do not limit or interpret the scope or meaning of the embodiments.

To allow those skilled in the art to carry out the present disclosure easily, the example embodiments of the present disclosure will be explained in detail as shown below by referring to attached drawings.

FIG. 1 is a drawing schematically illustrating a data breach preventing device which is used to prevent breach of original data to be used for deep learning in accordance with one example embodiment of the present disclosure.

By referring to FIG. 1, the data breach preventing device 100 may include a memory 101 for storing instructions to prevent the breach of the original data to be used for the deep learning, and a processor 102 for performing processes of preventing the breach of the original data to be used for the deep learning according to the instructions in the memory 101. As one example, the instructions may correspond to processes of watermarking data in order to generate the watermarked data from which a learning network outputs results different from those of the original data, but from which humans can recognize the original data.

Specifically, the data breach preventing device 100 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

Also, the processors of such devices may include hardware configuration of MPU (Micro Processing Unit) or CPU (Central Processing Unit), cache memory, data bus, etc. Additionally, the computing device may further include OS and software configuration of applications that achieve specific purposes.

Such description of the computing device does not exclude an integrated device including any combination of a processor, a memory, a medium, or any other computing components for implementing the present disclosure.

Meanwhile, if the original data is acquired, the processor 102 of the data breach preventing device 100, according to the instructions stored in the memory 101, may perform or support another device to perform a process of adding noise onto the original data, to thereby generate 1-st noisy data. And while increasing an integer k from 1 to n−1 where n is an integer larger than 1, the processor 102 may perform or support another device to perform iteration of (i) a process of inputting k-th noisy data into a learning network, to thereby allow the learning network to apply one or more learning operations to the k-th noisy data using one or more learned parameters of the learning network, and thus to output k-th characteristic information about the k-th noisy data, (ii) a process of launching an adversarial attack on the k-th noisy data via backpropagation using at least one of (ii-1) one or more (k_1)-st losses calculated by referring to (1) the k-th characteristic information and (2) at least one 1-st ground truth corresponding to the original data, and (ii-2) one or more (k_2)-nd losses calculated by referring to (1) at least one k-th task specific output created by using the k-th characteristic information and (2) at least one 2-nd ground truth corresponding to the original data, and thus a process of generating (k+1)-th noisy data. And as a result of the iteration, the processor 102 may perform or support another device to perform a process of generating n-th noisy data as the watermarked data corresponding to the original data.

Figure 2:
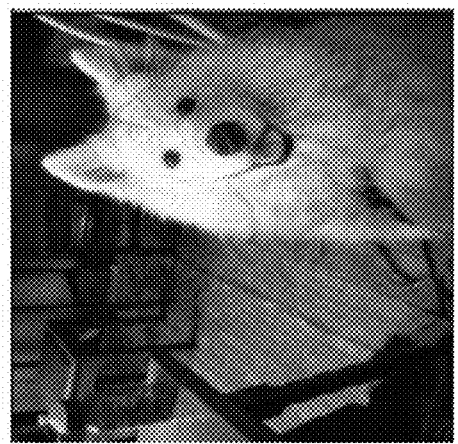
FIG. 2 is a drawing schematically illustrating an example of watermarked data generated by a method for preventing the breach of the original data to be used for the deep learning in accordance with one example embodiment of the present disclosure.
Figure 2:
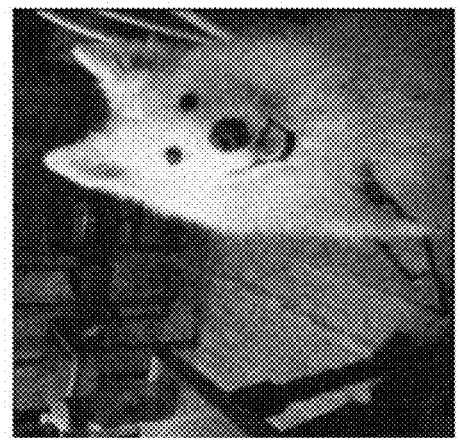
Figure 2:

As one example, by referring to FIG. 2, if an original image as shown in (A) is inputted, the data breach preventing device 100 may add noise onto the original image, to thereby generate a noisy image as shown in (B) from which humans can recognize the original image, and may launch an adversarial attack on the noisy image, to thereby generate a watermarked image as shown in (C) from which humans can recognize the original image but the learning network outputs results different from those of the original image, thus preventing the breach of the original data to be used for the deep-learning.

Figure 3:
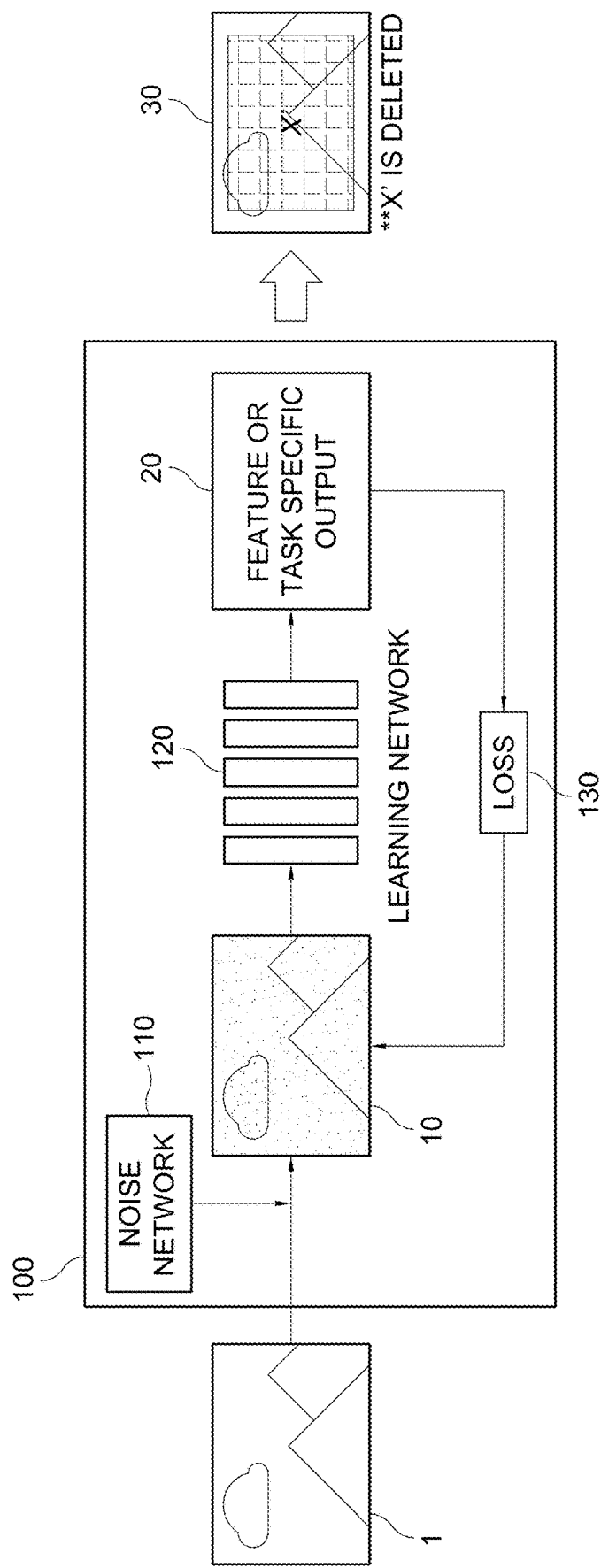
FIG. 3 is a drawing schematically illustrating the method for preventing the breach of the original data to be used for the deep learning in accordance with one example embodiment of the present disclosure.

A method for preventing the breach of the original data by using the data breach preventing device 100 in accordance with one example embodiment of the present disclosure is described by referring to FIG. 3 as follows.

First, if the original data 1 is acquired, the data breach preventing device 100 may instruct a noise network 110 to generate random noise. Herein, the original data 1 may be included in an original data set. And, the noise network 110 may generate the random noise having a normal distribution $N(\mu, \sigma^2)$ with one of means and one of variances created according to a noise function.

And, the data breach preventing device 100 may add noise to the original data, to thereby generate the 1-st noisy data 10.

Herein, humans can easily recognize the original data 1 from the 1-st noisy data 10. Also, the learning network may output from the 1-st noisy data 10 same or similar results to those from the original data 10.

Next, while increasing an integer k from 1 to n−1, the data breach preventing device 100 may perform or support another device to perform iteration of (i) a process of inputting the k-th noisy data into the learning network 120, to thereby allow the learning network 120 to apply the learning operations to the k-th noisy data using the learned parameters of the learning network, and thus to output k-th characteristic information 20 about the k-th noisy data, (ii) a process of launching the adversarial attack on the k-th noisy data via backpropagation using at least one of (ii-1) the (k_1)-st losses 130 calculated by referring to (1) the k-th characteristic information 20 and (2) the 1-st ground truth corresponding to the original data, and (ii-2) the (k_2)-nd losses 130 calculated by referring to (1) at least one k-th task specific output created by using the k-th characteristic information and (2) the 2-nd ground truth corresponding to the original data, and thus a process of generating (k+1)-th noisy data. And, as a result of the iteration, the data breach preventing device 100 may generate or support another device to generate n-th noisy data as the watermarked data 30 corresponding to the original data 1. Herein, n may be an integer larger than 1.

Detailed explanation is as follows.

First, the data breach preventing device 100 may input the 1-st noisy data 10 into the learning network 120.

Herein, the learning network 120 may include a machine learning network, but the scope of the present disclosure is not limited thereto, and may include any learning network capable of generating outputs by applying the learning operations using their own learned parameters to the inputted data. And, the machine learning network may include at least one of a k-Nearest Neighbors, a Linear Regression, a Logistic Regression, a Support Vector Machine (SVM), a Decision Tree and Random Forest, a Neural Network, a Clustering, a Visualization and a Dimensionality Reduction, an Association Rule Learning, a Deep Belief Network, a Reinforcement Learning, and a Deep learning algorithm, but the machine learning network is not limited thereto and may include various learning algorithms.

Then, the learning network 120 may apply the learning operations to the 1-st noisy data 10 using the learned parameters of the learning network 120, to thereby output the 1-st characteristic information about the 1-st noisy data 10.

Herein, the 1-st characteristic information may be features or logits corresponding to the 1-st noisy data. Also, the 1-st characteristic information may be feature values related to certain features in the 1-st noisy data, or the logits including values related to at least one of vectors, matrices, and coordinates related to the certain features. For example, if the 1-st noisy data are facial image data, the result above may be classes for face recognition, facial features, e.g., laughing expressions, coordinates of facial landmark points, e.g., both end points on far sides of an eye.

Then, the data breach preventing device 100 may perform or support another device to perform a process of launching the adversarial attack on the 1-st noisy data via backpropagation using at least one of (i) one or more (1_1)-st losses calculated by referring to the 1-st characteristic information and the 1-st ground truth corresponding to the original data, and (ii) one or more (1_2)-nd losses calculated by referring to (ii-1) at least one 1-st task specific output generated by using the 1-st characteristic information and (ii-2) the 2-nd ground truth corresponding to the original data, to thereby generate 2-nd noisy data, resulting in a single iteration.

Herein, during the backpropagation using at least part of the (1_1)-st losses and the (1_2)-nd losses, the data breach preventing device 100 may fix and not update the learned parameters of the learning network 120, and may perform the backpropagation to maximize at least part of the (1_1)-st losses and the (1_2)-nd losses regarding the 1-st noisy data only, to thereby convert the 1-st noisy date into the 2-nd noisy data. Then, the 2-nd noisy data may be recognized as the original data by humans, but may be recognized as data just with higher similarity to the original data by the learning network 120. That is, the learning network 120 may determine the original data, the 1-st noisy data, and the 2-nd noisy data as similar to one another, but with different probabilities of being true, e.g., being the original data. As one example, if the original data is an image of a dog, and if the learning network 120 is trained to recognize a dog on an image, then the learning network 120 may recognize the dog in all of the original data, the 1-st noisy data, and the 2-nd noisy data, however, the probabilities of the recognition result as the "dog" being true may decrease by degrees like 99% for the original data, 98% for the 1-st noisy data, and 97% for the 2-nd noisy data. This may be due to a fact that the 1-st noisy data is a result of adding the noise to the original data, and that the 2-nd noisy data is a result of launching the adversarial attack on the 1-st noisy data.

Also, during the backpropagation using at least part of the (1_1)-st losses and the (1_2)-nd losses, the data breach preventing device 100 may acquire at least one loss gradient for maximizing at least part of the (1_1)-st losses and the (1_2)-nd losses, and may backpropagate the loss gradient to the original data using gradient ascent.

Meanwhile, the task specific output may be an output of a task to be performed by the learning network 120, and may have various results according to the task learned by the learning network 120, such as a probability of a class for classification, coordinates resulting from regression for location detection, etc., and an activation function of an activation unit may be applied to the characteristic information outputted from the learning network 120, to thereby generate the task specific output according to the task to be performed by the learning network 120. Herein, the activation functions may include a sigmoid function, a linear function, a softmax function, an rlinear function, a square function, a sqrt function, an srlinear function, an abs function, a tank function, a brlinear function, etc., but the scope of the present disclosure is not limited thereto.

As one example, when the learning network 120 performs the task for the classification, the data breach preventing device 100 may map the characteristic information outputted from the learning network 120 onto each of classes, to thereby generate each of one or more probabilities of the inputted data, for each of the classes. Herein, each of the probabilities for each of the classes may represent each of probabilities of the characteristic information, outputted for each of the classes from the learning network 120, being true. For example, if the original data are the facial image data, a probability of the face having a laughing expression may be outputted as 0.75, and a probability of the face not having the laughing expression may be outputted as 0.25, and the like. Herein, a softmax algorithm may be used for mapping the characteristic information outputted from the learning network 120 onto each of the classes, but the scope of the present disclosure is not limited thereto, and various algorithms may be used for mapping the characteristic information onto each of the classes.

Next, the data breach preventing device 100 may input the 2-nd noisy data into the learning network 120.

Then, the learning network 120 may apply the learning operations to the 2-nd noisy data using the learned parameters of the learning network 120, to thereby output the 2-nd characteristic information about the 2-nd noisy data.

Then, the data breach preventing device 100 may perform a process of launching a subsequent adversarial attack on the 2-nd noisy data via backpropagation using at least part of (i) one or more (2_1)-st losses calculated by referring to the 2-nd characteristic information and the 1-st ground truth corresponding to the original data, and (ii) one or more (2_2)-nd losses calculated by referring to (ii-1) at least one 2-nd task specific output generated by using the 2-nd characteristic information and (ii-2) the 2-nd ground truth corresponding to the original data, to thereby generate 3-rd noisy data, resulting in a subsequent iteration.

Herein, since the 3-rd noisy data is created by the subsequent adversarial attack on the 2-nd noisy data, the probability of the result of the 3-rd noisy data being true may be lower than the probability of the result of the 2-nd noisy data being true, where the result of the 3-rd noisy data is outputted from the learning network 120 by applying the learning operations to the 3-rd noisy data, and the result of the 2-nd noisy data is outputted from the learning network 120 by applying the learning operations to the 2-nd noisy data.

Due to the repeated adversarial attacks in the iterations as such, the learning network 120 may output results derived from the noisy data different to those from the original data. As one example, on condition that the learning network 120 has been trained to recognize data as "dog" if the probability of the data being true is greater than 50%, the learning network 120 may recognize the (k+1)-th noisy data as not being "dog" due to the repeated adversarial attacks. However, humans can still recognize the original data from the (k+1)-th noisy data.

Meanwhile, the data breach preventing device 100 may perform or support another device to perform (i) a process of comparing (i-1) (k+1)-th characteristic information created by inputting the (k+1)-th noisy data into the learning network 120 and (i-2) original characteristic information created by inputting the original data 1 into the learning network 120, and if the (k+1)-th characteristic information and the original characteristic information are determined as different, a process of stopping the iteration and outputting the (k+1)-th noisy data as the watermarked data 30, and (ii) a process of comparing (ii-1) a (k+1)-th task specific output created by referring to the (k+1)-th characteristic information and (ii-2) an original task specific output created by referring to the original characteristic information, and if the (k+1)-th task specific output and the original task specific output are determined as different, a process of stopping the iteration and outputting the (k+1)-th noisy data as the watermarked data 30.

That is, while repeating the adversarial attack in the course of the iterations, since a probability of an output being true decreases, the data breach preventing device 100 may stop the iteration and output the noisy data at the iteration as the watermarked data, at the time when an outcome determined by the learning network 120 of the output becomes different from an identity, e.g., a GT or ground truth, of the original data, by referring to its corresponding probability.

Figure 4:
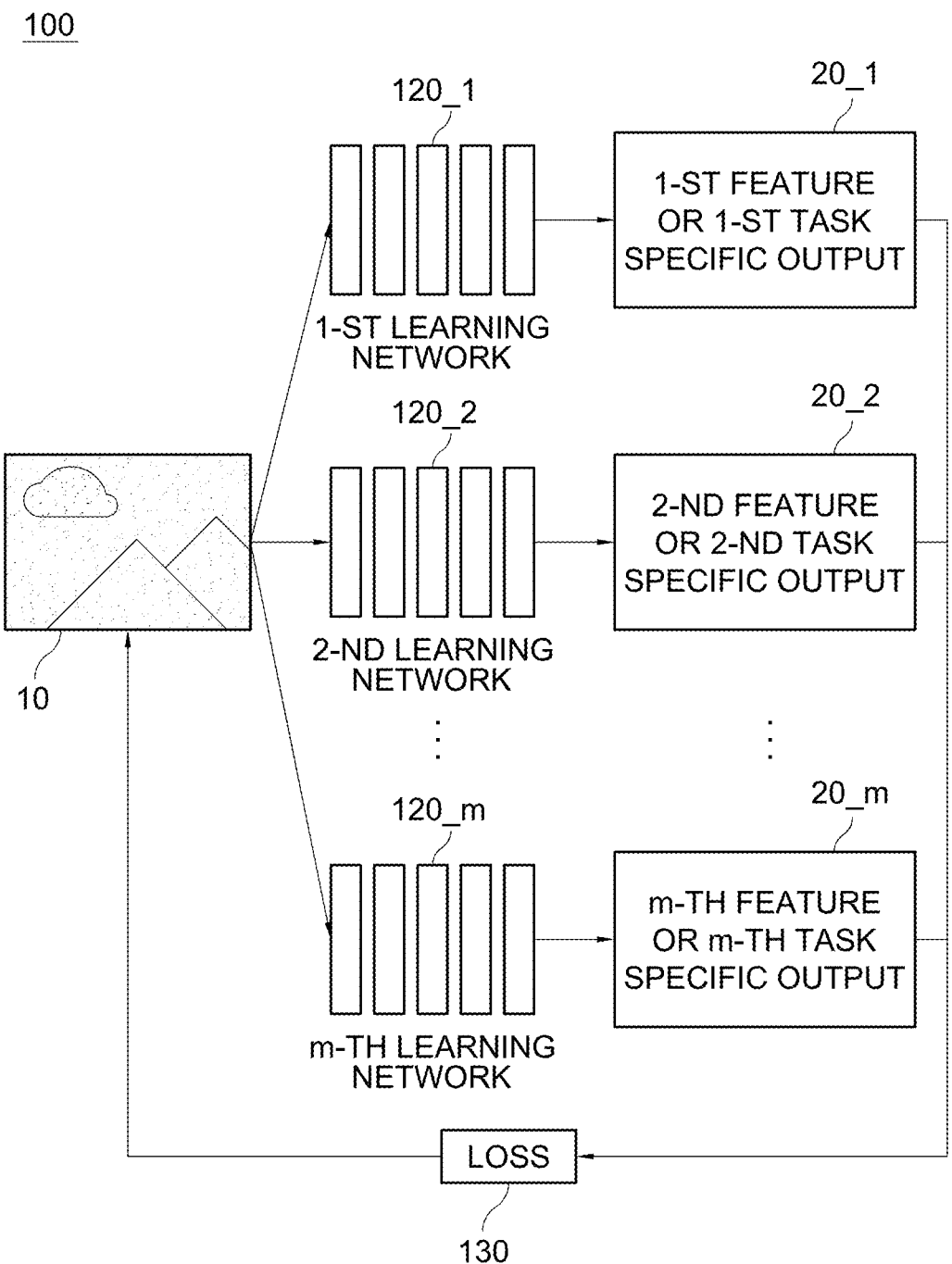
FIG. 4 is a drawing schematically illustrating the method for preventing the breach of the original data to be used for the deep learning in accordance with another example embodiment of the present disclosure.

FIG. 4 is a drawing schematically illustrating the method for preventing the breach of the original data to be used for the deep learning by launching the adversarial attack on the 1-st noisy data using multiple learning networks 120_1, 120_2, . . . , and 120_m with their own learned parameters in accordance with another example embodiment of the present disclosure. Herein, each of the multiple learning networks 120_1, 120_2, . . . , and 120_m may have completed learning to perform tasks at least part of which may be different from one another, and m may be an integer larger than 0. In the description below, the part easily deducible from the explanation of FIG. 3 will be omitted.

First, if the original data 1 is acquired, the data breach preventing device 100 may add noise to the original data, to thereby generate the 1-st noisy data 10.

Next, while increasing an integer k from 1 to n−1, the data breach preventing device 100 may perform or support another device to perform iteration of (i) a process of inputting the k-th noisy data respectively into the 1-st learning network 120_1 to the m-th learning network 120_m, to thereby allow the 1-st learning network 120_1 to the m-th learning network 120_m to (i-1) apply the learning operations with one or more 1-st learned parameters to one or more m-th learned parameters to the k-th noisy data respectively, and thus to (i-2) output (k_1)-st characteristic information 20_1 to (k_m)-th characteristic information 20_m about the k-th noisy data, (ii) a process of calculating the (k_1)-st losses by referring to at least one averaged value over a (k_1_1)-st loss to a (k_1_m)-th loss which are calculated by using the 1-st ground truth corresponding to the original data and each piece of the (k_1)-st characteristic information 20_1 to the (k_m)-th characteristic information 20_m, (iii) a process of calculating the (k_2)-nd losses by referring to at least one averaged value over a (k_2_1)-st loss to a (k_2_m)-th loss which are calculated by using the 2-nd ground truth corresponding to the original data and each of a (k_1)-st task specific output to a (k_m)-th task specific output respectively created by using the (k_1)-st characteristic information to the (k_m)-th characteristic information, and (iv) a process of launching the adversarial attack on the k-th noisy data via backpropagation using at least part of the (k_1)-st losses and the (k_2)-nd losses 130, and thus a process of generating (k+1)-th noisy data. And, as a result of the iteration, the data breach preventing device 100 may generate or support another device to generate n-th noisy data as the watermarked data 30 corresponding to the original data 1. Herein, m may be an integer larger than 0.

Detailed explanation is as follows.

First, the data breach preventing device 100 may input the 1-st noisy data 10 respectively into the 1-st learning network 120_1 to the m-th learning network 120_m.

Then, the 1-st learning network 120_1 to the m-th learning network 120_m may apply the learning operations, respectively using the 1-st learned parameters to the m-th learned parameters, to the 1-st noisy data 10, to thereby respectively output the (1_1)-st characteristic information to the (1_m)-th characteristic information about the 1-st noisy data 10.

Then, the data breach preventing device 100 may perform or support another device to perform (i) a process of calculating one or more (1_1)-st losses by referring to at least one averaged value over a (1_1_1)-st loss to a (1_1_m)-th loss which are calculated by using the 1-st ground truth corresponding to the original data and each piece of the (1_1)-st characteristic information to the (1_m)-th characteristic information, and (ii) a process of calculating one or more (1_2)-nd losses by referring to at least one averaged value over a (1_2_1)-st loss to a (1_2_m)-th loss which are calculated by using the 2-nd ground truth corresponding to the original data and each of a (1_1)-st task specific output to a (1_m)-th task specific output respectively created by using the (1_1)-st characteristic information to the (1_m)-th characteristic information.

And, the data breach preventing device 100 may perform a process of launching the adversarial attack on the 1-st noisy data via backpropagation using at least part of the (1_1)-st losses and the (1_2)-nd losses, to thereby generate the 2-nd noisy data, resulting in a single iteration.

Next, the data breach preventing device 100 may input the 2-nd noisy data respectively into the 1-st learning network 120_1 to the m-th learning network 120_m.

Then, the 1-st learning network 120_1 to the m-th learning network 120_m may apply the learning operations, respectively using the 1-st learned parameters to the m-th learned parameters, to the 2-nd noisy data, to thereby respectively output the (2_1)-st characteristic information to the (2_m)-th characteristic information about the 2-nd noisy data.

Then, the data breach preventing device 100 may perform or support another device to perform (i) a process of calculating one or more (2_1)-st losses by referring to at least one averaged value over a (2_1_1)-st loss to a (2_1_m)-th loss which are calculated by using (i-1) the 1-st ground truth corresponding to the original data and (i-2) each piece of the (2_1)-st characteristic information to the (2_m)-th characteristic information, and (ii) a process of calculating one or more (2_2)-nd losses by referring to at least one averaged value over a (2_2_1)-st loss to a (2_2_m)-th loss which are calculated by using (ii-1) the 2-nd ground truth corresponding to the original data and (ii-2) each of a (2_1)-st task specific output to a (2_m)-th task specific output respectively created by using the (2_1)-st characteristic information to the (2_m)-th characteristic information.

And, the data breach preventing device 100 may perform a process of launching a subsequent adversarial attack on the 2-nd noisy data via backpropagation using at least part of the (2_1)-st losses and the (2_2)-nd losses, to thereby generate the 3-rd noisy data, resulting in a subsequent iteration.

Due to the repeated adversarial attacks in the iterations as such, the 1-st learning network 120_1 to the m-th learning network 120_m may output results derived from the noisy data different from those derived from the original data.

Meanwhile, the data breach preventing device 100 may perform or support another device to perform (i) a process of averaging over a (k_1_1)-st summed loss to a (k_1_m)-th summed loss which are calculated by adding a ((k−1)_1)-st loss respectively onto each of the (k_1_1)-st loss to the (k_1_m)-th loss, in the process of calculating the (k_1)-st losses, and, (ii) a process of averaging over a (k_2_1)-st summed loss to a (k_2_m)-th summed loss which are calculated by adding a ((k−1)_2)-nd loss respectively onto each of the (k_2_1)-st loss to the (k_2_m)-th loss, in the process of calculating the (k_2)-nd losses. Herein, initial values of the losses at a first iteration may be zeros.

Also, the data breach preventing device 100 may perform or support another device to perform (i) a process of comparing between elements included in each of 1-st pairs whose elements are comprised of (i-1) each piece of the (k_1)-st characteristic information to the (k_m)-th characteristic information and (i-2) each piece of 1-st original characteristic information to m-th original characteristic information created by inputting the original data respectively into the 1-st learning network 120_1 to the m-th learning network 120_m, to thereby acquire a (k_1)-st condition value corresponding to the number of a part of the 1-st pairs whose elements are determined as different from each other, (ii) a process of comparing between elements included in each of 2-nd pairs whose elements are comprised of (ii-1) each of a (k_1)-st task specific output to a (k_m)-th task specific output and (ii-2) each of a 1-st original task specific output to an m-th original task specific output respectively created by referring to the 1-st original characteristic information to the m-th original characteristic information, to thereby acquire a (k_2)-nd condition value corresponding to the number of a part of the 2-nd pairs whose elements are determined as different from each other, (iii) a process of acquiring a k-th termination condition value by adding one of the (k_1)-st condition value and the (k_2)-nd condition value onto a (k−1)-th termination condition value, and (iv) after the (k+1)-th noisy data is created, a process of determining whether the k-th termination condition value is equal to or greater than a predetermined threshold, and if the k-th termination condition value is determined as equal to or greater than the predetermined threshold, a process of stopping the iteration and outputting the (k+1)-th noisy data as the watermarked data. Herein, initial values of the termination condition values at a first iteration may be zeros.

That is, while repeating the adversarial attack in the course of the iterations, since each of the probabilities of each of the outputs being true decreases, the data breach preventing device 100 may stop the iteration and output the noisy data as the watermarked data, at the time when the number of a part of outcomes determined by the 1-st learning network 120_1 to the m-th learning network 120_m being different from the identity, e.g., the GT or ground truth, of the original data becomes greater than the predetermined threshold.

Figure 5:
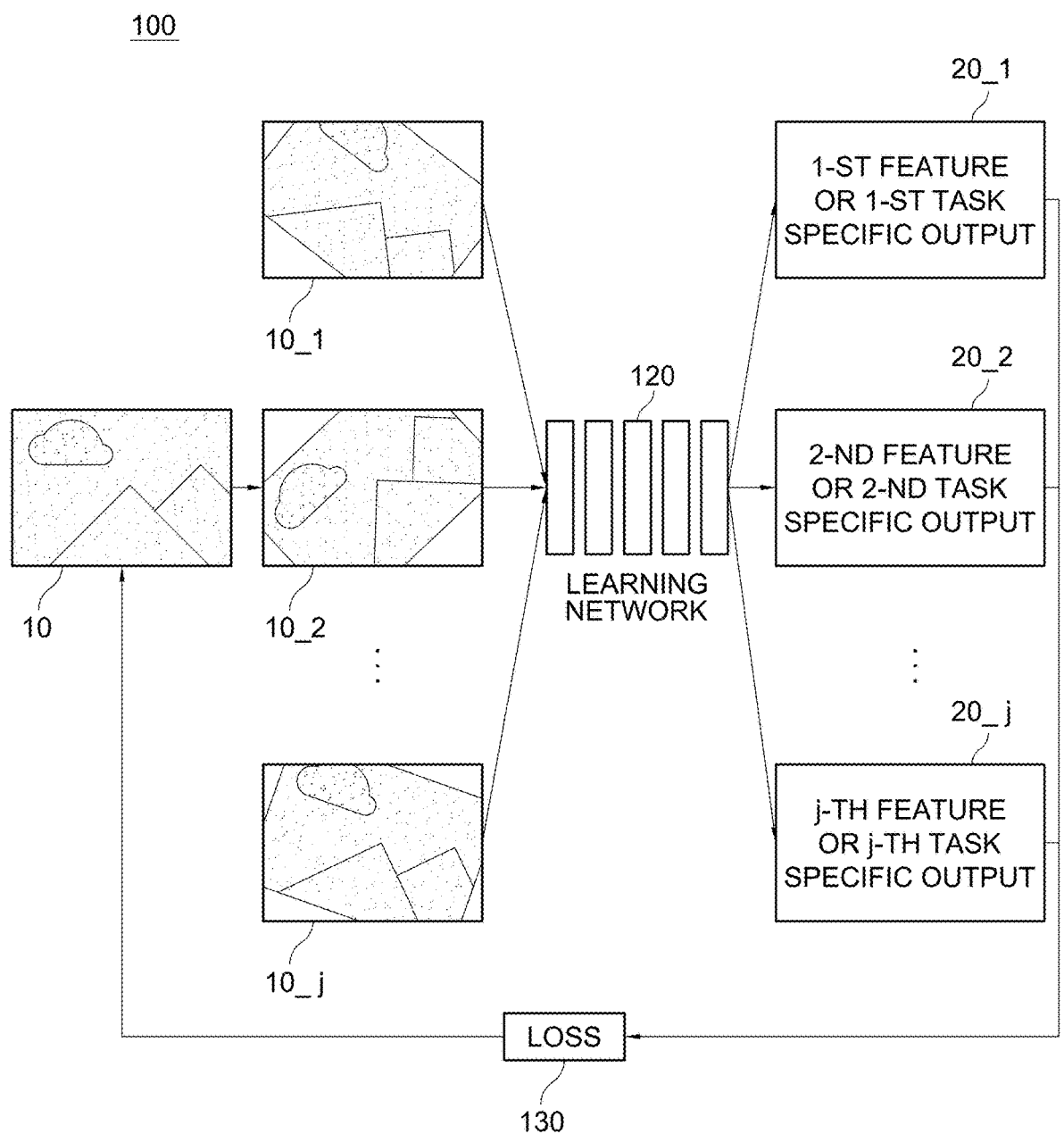
FIG. 5 is a drawing schematically illustrating the method for preventing the breach of the original data to be used for the deep learning in accordance with still another example embodiment of the present disclosure.

FIG. 5 is a drawing schematically illustrating the method for preventing the breach of the original data to be used for the deep learning by converting the 1-st noisy data into the (k_1)-st spatial data to the (k_j)-th spatial data through random rotation of the 1-st noisy data in accordance with still another example embodiment of the present disclosure.

In the description below, the part easily deducible from the explanation of FIGS. 3 and 4 will be omitted.

First, if the original data 1 is acquired, the data breach preventing device 100 may add noise to the original data, to thereby generate the 1-st noisy data 10.

Next, the data breach preventing device 100 may perform or support another device to perform iteration of (i) a process of applying the random rotation to the k-th noisy data, to thereby generate the (k_1)-st spatial data to the (k_j)-th spatial data, (ii) a process of inputting the (k_1)-st spatial data to the (k_j)-th spatial data into the learning network 120, to thereby allow the learning network 120 to apply the learning operations to the (k_1)-st spatial data to the (k_j)-th spatial data and thus to output (k_1)-st spatial characteristic information to (k_j)-th spatial characteristic information, (iii) a process of calculating the (k_1)-st losses by referring to at least one averaged value over a (k_1_1)-st spatial loss to a (k_1_j)-th spatial loss which are calculated by using the 1-st ground truth corresponding to the original data and each piece of the (k_1)-st spatial characteristic information to the (k_j)-th spatial characteristic information and, (iv) a process of calculating the (k_2)-nd losses by referring to at least one averaged value over a (k_2_1)-st spatial loss to a (k_2_j)-th spatial loss which are calculated by using the 2-nd ground truth corresponding to the original data and each of a (k_1)-st spatial task specific output to a (k_j)-th spatial task specific output respectively created by using the (k_1)-st spatial characteristic information to the (k_j)-th spatial characteristic information, and (v) a process of launching the adversarial attack on the k-th noisy data via backpropagation using at least part of the (k_1)-st losses and the (k_2)-nd losses 130, and thus a process of generating (k+1)-th noisy data. And, as a result of the iteration, the data breach preventing device 100 may generate or support another device to generate n-th noisy data as the watermarked data 30 corresponding to the original data 1. Herein, j may be an integer larger than 0.

Detailed explanation is as follows.

First, the data breach preventing device 100 may apply the random rotation to the 1-st noisy data, to thereby generate the (1_1)-st spatial data 10_1 to the (1_j)-th spatial data 10_j.

Herein, the data breach preventing device 100 may perform or support another device to perform a process of randomly selecting one or more angles θ ranging from −π to π, and repeating j times a process of rotating the k-th noisy data as corresponding to each of the angles θ, to thereby generate the (1_1)-st spatial data 10_1 to the (1_j)-th spatial data 10_j.

And, the data breach preventing device 100 may input the (1_1)-st spatial data 10_1 to the (1_j)-th spatial data 10_j into the learning network 120.

Then, the learning network 120 may apply the learning operations respectively to the (1_1)-st spatial data 10_1 to the (1_j)-th spatial data 10_j using the learned parameters of the learning network 120, to thereby output the (1_1)-st spatial characteristic information to the (1_j)-th spatial characteristic information respectively about the (1_1)-st spatial data 10_1 to the (1_j)-th spatial data 10_j.

Then, the data breach preventing device 100 may perform or support another device to perform (i) a process of calculating one or more (1_1)-st losses by referring to at least one averaged value over a (1_1_1)-st spatial loss to a (1_1_j)-th spatial loss which are calculated by using (i-1) the 1-st ground truth corresponding to the original data and (i-2) each piece of the (1_1)-st spatial characteristic information to the (1_j)-th spatial characteristic information, and (ii) a process of calculating one or more (1_2)-nd losses by referring to at least one averaged value over a (1_2_1)-st spatial loss to a (1_2_j)-th spatial loss which are calculated by using (ii-1) the 2-nd ground truth corresponding to the original data and (ii-2) each of a (1_1)-st spatial task specific output to a (1_j)-th spatial task specific output respectively created by using the (1_1)-st spatial characteristic information to the (1_j)-th spatial characteristic information.

And, the data breach preventing device 100 may perform a process of launching the adversarial attack on the 1-st noisy data via backpropagation using at least part of the (1_1)-st losses and the (1_2)-nd losses, to thereby generate the 2-nd noisy data, resulting in a single iteration.

Next, the data breach preventing device 100 may apply the random rotation to the 2-nd noisy data, to thereby generate the (2_1)-st spatial data to the (2_j)-th spatial data.

And, the data breach preventing device 100 may input the (2_1)-st spatial data to the (2_j)-th spatial data into the learning network 120.

Then, the learning network 120 may apply the learning operations respectively to the (2_1)-st spatial data to the (2_j)-th spatial data using the learned parameters of the learning network 120, to thereby output the (2_1)-st spatial characteristic information to the (2_j)-th spatial characteristic information respectively about the (2_1)-st spatial data to the (2_j)-th spatial data.

Then, the data breach preventing device 100 may perform or support another device to perform (i) a process of calculating one or more (2_1)-st losses by referring to at least one averaged value over a (2_1_1)-st spatial loss to a (2_1_j)-th spatial loss which are calculated by using (i-1) the 1-st ground truth corresponding to the original data and (i-2) each piece of the (2_1)-st spatial characteristic information to the (2_j)-th spatial characteristic information, and (ii) a process of calculating one or more (2_2)-nd losses by referring to at least one averaged value over a (2_2_1)-st spatial loss to a (2_2_j)-th spatial loss which are calculated by using (ii-1) the 2-nd ground truth corresponding to the original data and (ii-2) each of a (2_1)-st spatial task specific output to a (2_j)-th spatial task specific output respectively created by using the (2_1)-st spatial characteristic information to the (2_j)-th spatial characteristic information.

And, the data breach preventing device 100 may perform a process of launching a subsequent adversarial attack on the 2-nd noisy data via backpropagation using at least part of the (2_1)-st losses and the (2_2)-nd losses, to thereby generate the 3-rd noisy data, resulting in a subsequent iteration.

Due to the repeated adversarial attacks in the iterations as such, the learning network may output results derived from the noisy data different to those from the original data.

Meanwhile, the data breach preventing device 100 may perform or support another device to perform (i) a process of averaging over a (k_1_1)-st summed spatial loss to a (k_1_j)-th summed spatial loss which are calculated by adding the ((k−1)_1)-st loss respectively onto each of the (k_1_1)-st spatial loss to the (k_1_j)-th spatial loss, in the process of calculating the (k_1)-st losses, and (ii) a process of averaging over a (k_2_1)-st summed spatial loss to a (k_2_j)-th summed spatial loss which are calculated by adding the ((k−1)_2)-nd loss respectively onto each of the (k_2_1)-st spatial loss to the (k_2_j)-th spatial loss, in the process of calculating the (k_2)-nd losses. Herein, initial values of the losses at a first iteration may be zeros.

Also, the data breach preventing device 100 may perform or support another device to perform (i) a process of comparing between elements included in each of 1-st pairs whose elements are comprised of (i-1) each piece of the (k_1)-st spatial characteristic information to the (k_j)-th spatial characteristic information and (i-2) the original characteristic information created by inputting the original data into the learning network 120, to thereby acquire a (k_1)-st condition value corresponding to the number of a part of the 1-st pairs whose elements are determined as different from each other, (ii) a process of comparing between elements included in each of 2-nd pairs whose elements are comprised of (ii-1) each of a (k_1)-st spatial task specific output to a (k_j)-th spatial task specific output and (ii-2) an original task specific output created by referring to the original characteristic information, to thereby acquire a (k_2)-nd condition value corresponding to the number of a part of the 2-nd pairs whose elements are determined as different from each other, (iii) a process of acquiring a k-th termination condition value by adding one of the (k_1)-st condition value and the (k_2)-nd condition value onto a (k−1)-th termination condition value, and (iv) after the (k+1)-th noisy data is created, a process of determining whether the k-th termination condition value is equal to or greater than a predetermined threshold, and if the k-th termination condition value is determined as equal to or greater than the predetermined threshold, a process of stopping the iteration and outputting the (k+1)-th noisy data as the watermarked data.

That is, while repeating the adversarial attack in the course of the iterations, since the probability of the output being true decreases, the data breach preventing device 100 may stop the iteration and output the noisy data as the watermarked data, at the time when the number of a part of outcomes of the (k_1)-st spatial data to the (k_j)-th spatial data being different from the identity, e.g., the GT or ground truth, of the original data becomes greater than the predetermined threshold.

The present disclosure has an effect of preventing the breach of the original data to be used for the deep learning.

The present disclosure has another effect of protecting the original data, by generating resultant data humans can recognize but from which the learning network outputs different results, unlike when using the original data.

The present disclosure has still another effect of providing the watermarked data, from which the original data cannot be recovered by using data processing technology such as image processing technology.

The present disclosure has still yet another effect of providing the watermarked data which appears to humans as minimally deteriorated, and degrade accuracy of the learning network having been trained with the watermarked data.

The embodiments of the present disclosure as explained above can be implemented in a form of executable program command through a variety of computer means recordable in computer readable media. The computer readable media may include solely or in combination, program commands, data files, and data structures. The program commands recorded to the media may be components specially designed for the present disclosure or may be usable to those skilled in the art of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands may include not only a machine language code made by a complier but also a high level code that can be used by an interpreter etc., which may be executed by a computer. The aforementioned hardware device can work as more than a software module to perform the action of the present disclosure and vice versa.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for preventing breach of original data to be used for deep learning, comprising steps of:
   (a) a data breach preventing device, if the original data is acquired, performing or supporting another device to perform a process of adding noise onto the original data, to thereby generate 1-st noisy data; and
   (b) the data breach preventing device, (b1) while increasing an integer k from 1 to n−1 wherein n is an integer larger than 1, performing or supporting another device to perform iteration of (i) a process of inputting k-th noisy data into a learning network, to thereby allow the learning network to apply one or more learning operations to the k-th noisy data using one or more learned parameters of the learning network, and thus to output k-th characteristic information about the k-th noisy data, and (ii) a process of launching an adversarial attack on the k-th noisy data via backpropagation using at least one of (ii-1) one or more (k_1)-st losses calculated by referring to (1) the k-th characteristic information and (2) at least one 1-st ground truth corresponding to the original data, and (ii-2) one or more (k_2)-nd losses calculated by referring to (1) at least one k-th task specific output created by using the k-th characteristic information and (2) at least one 2-nd ground truth corresponding to the original data, and thus a process of generating (k+1)-th noisy data, and (b2) as a result of the iteration, generating or supporting another device to generate n-th noisy data as watermarked data corresponding to the original data;
   wherein the learning network includes a 1-st learning network to an m-th learning network respectively having one or more 1-st learned parameters to one or more m-th learned parameters wherein m is an integer greater than 0, and
   wherein, at the step of (b), the data breach preventing device performs or supports another device to perform a process of inputting the k-th noisy data respectively into the 1-st learning network to the m-th learning network, to thereby allow the 1-st learning network to the m-th learning network to (i) apply the learning operations with the 1-st learned parameters to the m-th learned parameters to the k-th noisy data respectively, and thus output (k_1)-st characteristic information to (k_m)-th characteristic information about the k-th noisy data, (ii) calculate the (k_1)-st losses by referring to at least one averaged value over a (k_1_1)-st loss to a (k_1_m)-th loss which are calculated by using the 1-st ground truth and each piece of the (k_1)-st characteristic information to the (k_m)-th characteristic information, and (iii) calculate the (k_2)-nd losses by referring to at least one averaged value over a (k_2_1)-st loss to a (k_2_m)-th loss which are calculated by using the 2-nd ground truth and each of a (k_1)-st task specific output to a (k_m)-th task specific output respectively created by using the (k_1)-st characteristic information to the (k_m)-th characteristic information.

2. The method of claim 1, wherein the data breach preventing device performs or supports another device to perform (i) a process of averaging over a (k_1_1)-st summed loss to a (k_1_m)-th summed loss which are calculated by adding a ((k−1)_1)-st loss respectively onto each of the (k_1_1)-st loss to the (k_1_m)-th loss, in the process of calculating the (k_1)-st losses, and
   (ii) a process of averaging over a (k_2_1)-st summed loss to a (k_2_m)-th summed loss which are calculated by adding a ((k−1)_2)-nd loss respectively onto each of the (k_2_1)-st loss to the (k_2_m)-th loss, in the process of calculating the (k_2)-nd losses.

3. The method of claim 1, wherein the data breach preventing device performs or supports another device to perform (i) a process of comparing between elements included in each of 1-st pairs whose elements are comprised of (i-1) each piece of the (k_1)-st characteristic information to the (k_m)-th characteristic information and (i-2) each piece of 1-st original characteristic information to m-th original characteristic information respectively created by inputting the original data into the 1-st learning network to the m-th learning network, to thereby acquire a (k_1)-st condition value corresponding to the number of a part of the 1-st pairs whose elements are determined as different from each other, (ii) a process of comparing between elements included in each of 2-nd pairs whose elements are comprised of (ii-1) each of a (k_1)-st task specific output to a (k_m)-th task specific output and (ii-2) each of a 1-st original task specific output to an m-th original task specific output respectively created by referring to the 1-st original characteristic information to the m-th original characteristic information, to thereby acquire a (k_2)-nd condition value corresponding to the number of a part of the 2-nd pairs whose elements are determined as different from each other, (iii) a process of acquiring a k-th termination condition value by adding one of the (k_1)-st condition value and the (k_2)-nd condition value onto a (k−1)-th termination condition value, and (iv) after the (k+1)-th noisy data is created, a process of determining whether the k-th termination condition value is equal to or greater than a predetermined threshold, and if the k-th termination condition value is determined as equal to or greater than the predetermined threshold, a process of stopping the iteration and outputting the (k+1)-th noisy data as the watermarked data.

4. The method of claim 1, wherein, at the step of (a), the data breach preventing device performs or supports another device to perform a process of adding random noise, according to a normal distribution with one of variances and one of means created by a noise function, onto the original data.

5. A method for preventing breach of original data to be used for deep learning, comprising the steps of:
   (a) a data breach preventing device, if the original data is acquired, performing or supporting another device to perform a process of adding noise onto the original data, to thereby generate 1-st noisy data; and
   (b) the data breach preventing device, (b1) while increasing an integer k from 1 to n−1 wherein n is an integer larger than 1, performing or supporting another device to perform iteration of (i) a process of inputting k-th noisy data into a learning network, to thereby allow the learning network to apply one or more learning operations to the k-th noisy data using one or more learned parameters of the learning network, and thus to output k-th characteristic information about the k-th noisy data, and (ii) a process of launching an adversarial attack on the k-th noisy data via backpropagation using at least one of (ii-1) one or more (k_1)-st losses calculated by referring to (1) the k-th characteristic information and (2) at least one 1-st ground truth corresponding to the original data, and (ii-2) one or more (k_2)-nd losses calculated by referring to (1) at least one k-th task specific output created by using the k-th characteristic information and (2) at least one 2-nd ground truth corresponding to the original data, and thus a process of generating (k+1)-th noisy data, and (b2) as a result of the iteration, generating or supporting another device to generate n-th noisy data as watermarked data corresponding to the original data;

wherein, at the step of (b), the data breach preventing device performs or supports another device to perform (i) a process of applying random rotation to the k-th noisy data, to thereby generate (k_1)-st spatial data to (k_j)-th spatial data wherein j is an integer greater than 0, (ii) a process of inputting the (k_1)-st spatial data to the (k_j)-th spatial data into the learning network, to thereby allow the learning network to apply the deep-learning operation to the (k_1)-st spatial data to the (k_j)-th spatial data and thus to output (k_1)-st spatial characteristic information to (k_j)-th spatial characteristic information, (iii) a process of calculating the (k_1)-st losses by referring to at least one averaged value over a (k_1_1)-st spatial loss to a (k_1_j)-th spatial loss which are calculated by using the 1-st ground truth and each piece of the (k_1)-st spatial characteristic information to the (k_j)-th spatial characteristic information, and (iv) a process of calculating the (k_2)-nd losses by referring to at least one averaged value over a (k_2_1)-st spatial loss to a (k_2_j)-th spatial loss which are calculated by using the 2-nd ground truth and each of a (k_1)-st spatial task specific output to a (k_j)-th spatial task specific output respectively created by using the (k_1)-st spatial characteristic information to the (k_j)-th spatial characteristic information.

6. The method of claim 5, wherein the data breach preventing device performs or supports another device to perform (i) a process of averaging over a (k_1_1)-st summed spatial loss to a (k_1_j)-th summed spatial loss which are calculated by adding a ((k−1)_1)-st loss respectively onto each of the (k_1_1)-st spatial loss to the (k_1_j)-th spatial loss, in the process of calculating the (k_1)-st losses, and (ii) a process of averaging over a (k_2_1)-st summed spatial loss to a (k_2_j)-th summed spatial loss which are calculated by adding a ((k−1)_2)-nd loss respectively onto each of the (k_2_1)-st spatial loss to the (k_2_j)-th spatial loss, in the process of calculating the (k_2)-nd losses.

7. The method of claim 5, wherein the data breach preventing device performs or supports another device to perform (i) a process of comparing between elements included in each of 1-st pairs whose elements are comprised of (i-1) each piece of the (k_1)-st spatial characteristic information to the (k_j)-th spatial characteristic information and (i-2) each piece of original characteristic information created by inputting the original data into the learning network, to thereby acquire a (k_1)-st condition value corresponding to the number of a part of the 1-st pairs whose elements are determined as different from each other, (ii) a process of comparing between elements included in each of 2-nd pairs whose elements are comprised of (ii-1) each of a (k_1)-st spatial task specific output to a (k_j)-th spatial task specific output and (ii-2) an original task specific output created by referring to the original characteristic information, to thereby acquire a (k_2)-nd condition value corresponding to the number of a part of the 2-nd pairs whose elements are determined as different from each other, (iii) a process of acquiring a k-th termination condition value by adding one of the (k_1)-st condition value and the (k_2)-nd condition value onto a (k−1)-th termination condition value, and (iv) after the (k+1)-th noisy data is created, a process of determining whether the k-th termination condition value is equal to or greater than a predetermined threshold, and if the k-th termination condition value is determined as equal to or greater than the predetermined threshold, a process of stopping the iteration and outputting the (k+1)-th noisy data as the watermarked data.

8. The method of claim 5, wherein the data breach preventing device performs or supports another device to perform a process of randomly selecting one or more angles θ ranging from −π to π and a process of rotating the k-th noisy data as corresponding to each of the angles θ, in the process of creating the (k_1)-st spatial data to the (k_j)-th spatial data.

9. The method of claim 5, wherein, at the step of (a), the data breach preventing device performs or supports another device to perform a process of adding random noise, according to a normal distribution with one of variances and one of means created by a noise function, onto the original data.

10. A method for preventing breach of original data to be used for deep learning, comprising the steps of:

(a) a data breach preventing device, if the original data is acquired, performing or supporting another device to perform a process of adding noise onto the original data, to thereby generate 1-st noisy data; and (b) the data breach preventing device, (b1) while increasing an integer k from 1 to n−1 wherein n is an integer larger than 1, performing or supporting another device to perform iteration of (i) a process of inputting k-th noisy data into a learning network, to thereby allow the learning network to apply one or more learning operations to the k-th noisy data using one or more learned parameters of the learning network, and thus to output k-th characteristic information about the k-th noisy data, and (ii) a process of launching an adversarial attack on the k-th noisy data via backpropagation using at least one of (ii-1) one or more (k_1)-st losses calculated by referring to (1) the k-th characteristic information and (2) at least one 1-st ground truth corresponding to the original data, and (ii-2) one or more (k_2)-nd losses calculated by referring to (1) at least one k-th task specific output created by using the k-th characteristic information and (2) at least one 2-nd ground truth corresponding to the original data, and thus a process of generating (k+1)-th noisy data, and (b2) as a result of the iteration, generating or supporting another device to generate n-th noisy data as watermarked data corresponding to the original data;

wherein, at the step of (b), the data breach preventing device performs or supports another device to perform (i) a process of comparing (i-1) (k+1)-th characteristic information created by inputting the (k+1)-th noisy data into the learning network and (i-2) original characteristic information created by inputting the original data into the learning network, and if the (k+1)-th characteristic information and the original characteristic information are determined as different, a process of stopping the iteration and outputting the (k+1)-th noisy data as the watermarked data, and (ii) a process of comparing (ii-1) a (k+1)-th task specific output created by referring to the (k+1)-th characteristic information and (ii-2) an original task specific output created by referring to the original characteristic information, and if the (k+1)-th task specific output and the original task specific output are determined as different, a process of stopping the iteration and outputting the (k+1)-th noisy data as the watermarked data.

11. A data breach preventing device for preventing breach of original data to be used for deep learning, comprising:
at least one memory that stores instructions; and
at least one processor configured to execute the instructions to perform or support another device to perform: (I) if the original data is acquired, a process of adding noise onto the original data, to thereby generate 1-st noisy data, and (II) (II-1) while increasing an integer k from 1 to n−1 wherein n is an integer larger than 1, (i) a process of inputting k-th noisy data into a learning network, to thereby allow the learning network to apply one or more learning operations to the k-th noisy data using one or more learned parameters of the learning network, and thus to output k-th characteristic information about the k-th noisy data, and (ii) a process of launching an adversarial attack on the k-th noisy data via backpropagation using at least one of (ii-1) one or more (k_1)-st losses calculated by referring to (1) the k-th characteristic information and (2) at least one 1-st ground truth corresponding to the original data, and (ii-2) one or more (k_2)-nd losses calculated by referring to (1) at least one k-th task specific output created by using the k-th characteristic information and (2) at least one 2-nd ground truth corresponding to the original data, and thus a process of generating (k+1)-th noisy data, and (II-2) as a result of the iteration, a process of generating n-th noisy data as watermarked data corresponding to the original data;
wherein the learning network includes a 1-st learning network to an m-th learning network respectively having one or more 1-st learned parameters to one or more m-th learned parameters wherein m is an integer greater than 0, and
wherein, at the process of (II), the processor performs or supports another device to perform a process of inputting the k-th noisy data respectively into the 1-st learning network to the m-th learning network, to thereby allow the 1-st learning network to the m-th learning network to (i) apply the learning operations with the 1-st learned parameters to the m-th learned parameters to the k-th noisy data respectively, and thus output (k_1)-st characteristic information to (k_m)-th characteristic information about the k-th noisy data, (ii) calculate the (k_1)-st losses by referring to at least one averaged value over a (k_1_1)-st loss to a (k_1_m)-th loss which are calculated by using the 1-st ground truth and each piece of the (k_1)-st characteristic information to the (k_m)-th characteristic information, and (iii) calculate the (k_2)-nd losses by referring to at least one averaged value over a (k_2_1)-st loss to a (k_2_m)-th loss which are calculated by using the 2-nd ground truth and each of a (k_1)-st task specific output to a (k_m)-th task specific output respectively created by using the (k_1)-st characteristic information to the (k_m)-th characteristic information.

12. The data breach preventing device of claim 11, wherein the processor performs or supports another device to perform (i) a process of averaging over a (k_1_1)-st summed loss to a (k_1_m)-th summed loss which are calculated by adding a ((k−1)_1)-st loss respectively onto each of the (k_1_1)-st loss to the (k_1_m)-th loss, in the process of calculating the (k_1)-st losses, and
(ii) a process of averaging over a (k_2_1)-st summed loss to a (k_2_m)-th summed loss which are calculated by adding a ((k−1)_2)-nd loss respectively onto each of the (k_2_1)-st loss to the (k_2_m)-th loss, in the process of calculating the (k_2)-nd losses.

13. The data breach preventing device of claim 11, wherein the processor performs or supports another device to perform (i) a process of comparing between elements included in each of 1-st pairs whose elements are comprised of (i-1) each piece of the (k_1)-st characteristic information to the (k_m)-th characteristic information and (i-2) each piece of 1-st original characteristic information to m-th original characteristic information respectively created by inputting the original data into the 1-st learning network to the m-th learning network, to thereby acquire a (k_1)-st condition value corresponding to the number of a part of the 1-st pairs whose elements are determined as different from each other, (ii) a process of comparing between elements included in each of 2-nd pairs whose elements are comprised of (ii-1) each of a (k_1)-st task specific output to a (k_m)-th task specific output and (ii-2) each of a 1-st original task specific output to an m-th original task specific output respectively created by referring to the 1-st original characteristic information to the m-th original characteristic information, to thereby acquire a (k_2)-nd condition value corresponding to the number of a part of the 2-nd pairs whose elements are determined as different from each other, (iii) a process of acquiring a k-th termination condition value by adding one of the (k_1)-st condition value and the (k_2)-nd condition value onto a (k−1)-th termination condition value, and (iv) after the (k+1)-th noisy data is created, a process of determining whether the k-th termination condition value is equal to or greater than a predetermined threshold, and if the k-th termination condition value is determined as equal to or greater than the predetermined threshold, a process of stopping the iteration and outputting the (k+1)-th noisy data as the watermarked data.

14. The data breach preventing device of claim 11, wherein, at the process of (I), the processor performs or supports another device to perform a process of adding random noise, according to a normal distribution with one of variances and one of means created by a noise function, onto the original data.

15. A data breach preventing device for preventing breach of original data to be used for deep learning, comprising:
at least one memory that stores instructions; and
at least one processor configured to execute the instructions to perform or support another device to perform: (I) if the original data is acquired, a process of adding noise onto the original data, to thereby generate 1-st noisy data, and (II) (II-1) while increasing an integer k from 1 to n−1 wherein n is an integer larger than 1, (i) a process of inputting k-th noisy data into a learning network, to thereby allow the learning network to apply one or more learning operations to the k-th noisy data using one or more learned parameters of the learning network, and thus to output k-th characteristic information about the k-th noisy data, and (ii) a process of launching an adversarial attack on the k-th noisy data via backpropagation using at least one of (ii-1) one or more (k_1)-st losses calculated by referring to (1) the k-th characteristic information and (2) at least one 1-st ground truth corresponding to the original data, and (ii-2) one or more (k_2)-nd losses calculated by referring to (1) at least one k-th task specific output created by using the k-th characteristic information and (2) at least one 2-nd ground truth corresponding to the original data, and thus a process of generating (k+1)-th noisy data, and (II-2) as a result of the iteration, a process of generating n-th noisy data as watermarked data corresponding to the original data;
wherein, at the process of (II), the processor performs or supports another device to perform (i) a process of applying random rotation to the k-th noisy data, to thereby generate (k_1)-st spatial data to (k_j)-th spatial data wherein j is an integer greater than 0, (ii) a process of inputting the (k_1)-st spatial data to the (k_j)-th spatial data into the learning network, to thereby allow the learning network to apply the deep-learning operation to the (k_1)-st spatial data to the (k_j)-th spatial data and thus to output (k_1)-st spatial characteristic information to (k_j)-th spatial characteristic information, (iii) a process of calculating the (k_1)-st losses by referring to at least one averaged value over a (k_1_1)-st spatial loss to a (k_1_j)-th spatial loss which are calculated by using the 1-st ground truth and each piece of the (k_1)-st spatial characteristic information to the (k_j)-th spatial characteristic information, and (iv) a process of calculating the (k_2)-nd losses by referring to at least one averaged value over a (k_2_1)-st spatial loss to a (k_2_j)-th spatial loss which are calculated by using the 2-nd ground truth and each of a (k_1)-st spatial task specific output to a (k_j)-th spatial task specific output respectively created by using the (k_1)-st spatial characteristic information to the (k_j)-th spatial characteristic information.

16. The data breach preventing device of claim 15, wherein the processor performs or supports another device to perform (i) a process of averaging over a (k_1_1)-st summed spatial loss to a (k_1_j)-th summed spatial loss which are calculated by adding a ((k−1)_1)-st loss respectively onto each of the (k_1_1)-st spatial loss to the (k_1_j)-th spatial loss, in the process of calculating the (k_1)-st losses, and
(ii) a process of averaging over a (k_2_1)-st summed spatial loss to a (k_2_j)-th summed spatial loss which are calculated by adding a ((k−1)_2)-nd loss respectively onto each of the (k_2_1)-st spatial loss to the (k_2_j)-th spatial loss, in the process of calculating the (k_2)-nd losses.

17. The data breach preventing device of claim 15, wherein the processor performs or supports another device to perform (i) a process of comparing between elements included in each of 1-st pairs whose elements are comprised of (i-1) each piece of the (k_1)-st spatial characteristic information to the (k_j)-th spatial characteristic information and (i-2) each piece of original characteristic information created by inputting the original data into the learning network, to thereby acquire a (k_1)-st condition value corresponding to the number of a part of the 1-st pairs whose elements are determined as different from each other, (ii) a process of comparing between elements included in each of 2-nd pairs whose elements are comprised of (ii-1) each of a (k_1)-st spatial task specific output to a (k_j)-th spatial task specific output and (ii-2) an original task specific output created by referring to the original characteristic information, to thereby acquire a (k_2)-nd condition value corresponding to the number of a part of the 2-nd pairs whose elements are determined as different from each other, (iii) a process of acquiring a k-th termination condition value by adding one of the (k_1)-st condition value and the (k_2)-nd condition value onto a (k−1)-th termination condition value, and (iv) after the (k+1)-th noisy data is created, a process of determining whether the k-th termination condition value is equal to or greater than a predetermined threshold, and if the k-th termination condition value is determined as equal to or greater than the predetermined threshold, a process of stopping the iteration and outputting the (k+1)-th noisy data as the watermarked data.

18. The data breach preventing device of claim 15, wherein the processor performs or supports another device to perform a process of randomly selecting one or more angles θ ranging from −π to π and a process of rotating the k-th noisy data as corresponding to each of the angles θ, in the process of creating the (k_1)-st spatial data to the (k_j)-th spatial data.

19. The data breach preventing device of claim 15, wherein, at the process of (I), the processor performs or supports another device to perform a process of adding random noise, according to a normal distribution with one of variances and one of means created by a noise function, onto the original data.

20. A data breach preventing device for preventing breach of original data to be used for deep learning, comprising:
at least one memory that stores instructions; and
at least one processor configured to execute the instructions to perform or support another device to perform:
(I) if the original data is acquired, a process of adding noise onto the original data, to thereby generate 1-st noisy data, and (II) (II-1) while increasing an integer k from 1 to n−1 wherein n is an integer larger than 1, (i) a process of inputting k-th noisy data into a learning network, to thereby allow the learning network to apply one or more learning operations to the k-th noisy data using one or more learned parameters of the learning network, and thus to output k-th characteristic information about the k-th noisy data, and (ii) a process of launching an adversarial attack on the k-th noisy data via backpropagation using at least one of (ii-1) one or more (k_1)-st losses calculated by referring to (1) the k-th characteristic information and (2) at least one 1-st ground truth corresponding to the original data, and (ii-2) one or more (k_2)-nd losses calculated by referring to (1) at least one k-th task specific output created by using the k-th characteristic information and (2) at least one 2-nd ground truth corresponding to the original data, and thus a process of generating (k+1)-th noisy data, and (II-2) as a result of the iteration, a process of generating n-th noisy data as watermarked data corresponding to the original data;
wherein, at the process of (II), the processor performs or supports another device to perform (i) a process of comparing (i-1) (k+1)-th characteristic information created by inputting the (k+1)-th noisy data into the learning network and (i-2) original characteristic information created by inputting the original data into the learning network, and if the (k+1)-th characteristic information and the original characteristic information are determined as different, a process of stopping the iteration and outputting the (k+1)-th noisy data as the watermarked data, and (ii) a process of comparing (ii-1) a (k+1)-th task specific output created by referring to the (k+1)-th characteristic information and (ii-2) an original task specific output created by referring to the original characteristic information, and if the (k+1)-th task specific output and the original task specific output are determined as different, a process of stopping the iteration and outputting the (k+1)-th noisy data as the watermarked data.

* * * * *